US012714030B2

(12) United States Patent
Nona et al.

(10) Patent No.: US 12,714,030 B2
(45) Date of Patent: Aug. 25, 2026

(54) CONTROLLING BALE WEIGHTS

(71) Applicant: CNH Industrial Belgium N.V., Zedelgem (BE)

(72) Inventors: Kenny Nona, Linden (BE); Rian Beck, Leuven (BE)

(73) Assignee: CNH Industrial Belgium N.V. (BE)

( * ) Notice: Subject to any disclaimer, the term of this patent is extended or adjusted under 35 U.S.C. 154(b) by 373 days.

(21) Appl. No.: 18/389,339

(22) Filed: Nov. 14, 2023

(65) Prior Publication Data

US 2024/0155977 A1 May 16, 2024

(30) Foreign Application Priority Data

Nov. 15, 2022 (EP) .................................... 22207394

(51) Int. Cl.
*A01F 15/08* (2006.01)
*A01F 15/10* (2006.01)

(52) U.S. Cl.
CPC ........ *A01F 15/0825* (2013.01); *A01F 15/101* (2013.01)

(58) Field of Classification Search
CPC .. A01F 15/0825; A01F 15/101; A01F 15/071; A01F 15/0883; G01G 19/08
See application file for complete search history.

(56) References Cited

U.S. PATENT DOCUMENTS 6,378,276 B1 * 4/2002 Dorge .................... G01G 19/08 177/136
2012/0240797 A1 9/2012 Verhaeghe et al.
2013/0008324 A1 1/2013 Verhaeghe et al.
2016/0113205 A1 4/2016 Verhaeghe et al.

OTHER PUBLICATIONS

Extended European Search Report for European Application No. 22207394.2, dated Apr. 14, 2023, 7 pages.

* cited by examiner

*Primary Examiner* — Matthew Troutman
*Assistant Examiner* — Robert E Pezzuto
(74) *Attorney, Agent, or Firm* — Buchanan Ingersoll & Rooney PC

(57) ABSTRACT

A method of controlling the weight of bales made by an agricultural baler. The method includes: receiving a bale weight setpoint; receiving crop parameter data; and, while a bale is being made: receiving baler operating data relating to baling parameters; inputting the crop parameter data and baler operating data into a weight prediction model to generate a predicted final weight of the bale; and changing a baling parameter setpoint of one of the baling parameters based on the predicted final weight of the bale and the bale weight setpoint.

14 Claims, 2 Drawing Sheets

CONTROLLING BALE WEIGHTS

CROSS REFERENCE TO RELATED APPLICATION

This application claims priority to European Application No. 22207394.2, filed Nov. 15, 2022, the content of such application being incorporated by reference herein in its entirety.

FIELD OF THE INVENTION

The present invention relates to a method of controlling the weight of bales made by an agricultural baler and to an agricultural baler comprising a controller configured to carry out said method.

BACKGROUND OF THE INVENTION

Agricultural balers are used to consolidate and package crop material so as to facilitate the storage and handling of the crop material for later use. For example, when the crop is hay a mower-conditioner is typically used to cut and condition the crop material for windrow drying in the sun. As another example, when the crop is straw a combine harvester discharges non-grain crop material from the rear of the harvester defining the straw which is to be picked up by the baler. The cut crop material is usually dried, and a baler, such as a large square baler or round baler, straddles the windrows and travels along the windrows to pick up the crop material and form it into bales.

A large square baler typically comprises two main chambers used in the formation of the bales, being a pre-compression chamber and a bale chamber. Crop material is gathered and pushed into the pre-compression chamber, where a slice of crop material is formed. The pre-compression chamber is linked to the bale chamber in such a manner that the slice of crop material is periodically transferred into the bale chamber. In the bale chamber, a plunger reciprocally moves back and forth, thereby pressing a square bale from subsequently fed slices while the side walls, the top wall, and/or the bottom wall apply a controlled amount of pressure to the respective surfaces of the bale that is being formed.

When the bale is completed, a piece of twine is wrapped around the bale and tied to keep the bale together. While a new bale is formed in the bale chamber, the completed bale is pushed to the rear of the bale chamber by this new bale. The size of bale chambers is such that it is typical for at least one, and possibly two or more completed bales to be present in the bale chamber while a bale is being made. Eventually, the completed bale is pushed through an outlet at the rear of the bale chamber and dropped on the field behind the agricultural baler. After the completed bale has left the bale chamber and while it is waiting to be expelled from the baler, its weight may be measured by a bale weight sensor in a weighing system, such as a scale.

In practice, due to, for example, variations in drive speed, crop density, and crop properties, not all bales are made identically and consequently different bales will have different weights. However, it is often desirable for the bales made by the baler to be substantially identical in weight.

It is therefore common for baler controllers to be programmed to automatically adjust baler-related parameter(s), and/or setpoint(s) related thereto, in response to the measured weight of the bales and specifically to a comparison between the measured weight of the finished bales and a target weight. For example, if the measured weight is lower than the target weight, one option would be to increase the chamber load (i.e. the pressure exerted onto the bale inside the bale chamber), for example by increasing a chamber load setpoint to compress the bale to a greater extent during formation to increase the density of the bale.

There are, however, certain drawbacks to this approach, principal among them the fact that the parameters or setpoints can only be adjusted once per bale made. Since this can only happen after the bale has been weighed, this also means that the parameter(s) and/or setpoint(s) are adjusted based on the third-most recent bale to have been made. Given that a typical baler may achieve a speed of between 5 and 20 km/h, and that a bale may typically take around 50 seconds to be made, the baler may travel between 50 and 250 m, or even further during the time that a bale is made. Given the delay between a bale being finished and it being weighed caused by the presence of multiple bales in the chamber, it is possible for the baler to have also travelled this far in this intervening period. Since crop-related parameters, especially crop moisture level may change over much shorter distances, such control systems therefore suffer the twin drawbacks of basing changes to baler-related parameters or setpoints on 'old' data and then not being able to adjust those parameters or setpoints at a high enough frequency to mitigate for this.

It is an aim of the present invention to address one or more disadvantages associated with the prior art.

SUMMARY OF THE INVENTION

In a first aspect, the invention provides a method of controlling the weight of bales made by an agricultural baler. The method comprises: receiving a bale weight setpoint; and, while a bale is being made: receiving crop parameter data; receiving baler operating data relating to baling parameters; inputting the crop parameter data and baler operating data into a weight prediction model to generate a predicted final weight of the bale; and changing a baling parameter setpoint of one of the baling parameters based on the predicted final weight of the bale and the bale weight setpoint.

By utilising a model to predict a final weight of the bale and by changing one of the baling parameter setpoints in response to the difference between the predicted final weight and the bale weight setpoint, the invention allows for adjustment of the factors affecting the bale weight while the bale is being made. Importantly, the baler operating data which determine the predicted final weight of the bale, and consequently the adjustments that are made, relate to the bale being made, and not to a previous bale, which may have been made with different crop conditions from a different region of a field. Therefore, the invention enables more accurate control of bale weight.

The baling parameters may comprise an average chamber load in a chamber of the baler, an average plunger torque of a plunger in the baler, a slice thickness variation parameter representing the thickness of slices of the bale and the number of slices per bale. The averages referenced above may be arithmetic mean averages, or an alternative average, such as a median value. The slice thickness variation parameter may be a standard deviation of the slice thickness while the crop parameter data may comprise crop type data and crop moisture level data.

Changing the baling parameter setpoint of one of the baling parameters may comprise: calculating a difference between the predicted final weight of the bale and the bale weight setpoint; calculating a setpoint correction using the model based on the difference; multiplying the setpoint correction by a gain factor to generate a modified baling setpoint correction; and applying the modified baling setpoint correction to the baling parameter setpoint. By modifying the setpoint correction with the gain factor, the way in which the predicted final bale weight converges to the bale weight setpoint can be controlled.

Preferably, the gain factor may be between zero and one. This aims to provide stable convergence of the predicted final weight of the bale to the bale weight setpoint, in that the model trends towards the correct values but does not necessarily return the 'perfect' setpoint for the set of data considered, as errors in the model may then cause the bale weight setpoint to oscillate, causing convergence to be much slower overall.

The baling parameter setpoint may be selected from the group comprising a chamber load setpoint, a slice thickness setpoint and a number of slices per bale. The step of changing the baling parameter setpoint may comprise changing either the chamber load setpoint or the slice thickness setpoint, or the number of slices per bale. It is also possible for a bale length setpoint to be changed. Naturally, the slice thickness, number of slices and bale length are all related factors, given that the bale length can be represented by the number of slices multiplied by the slice thickness.

Preferably, the chamber load setpoint is the baling parameter setpoint that is changed. This may occur if the current values of the chamber load setpoint and a plunger torque of a plunger in the baler are within respective threshold operating ranges. It is preferred to change the chamber load setpoint as it is generally preferred that bales are homogeneous with consistent slice thicknesses within each bale, but also consistent bale lengths to ensure that different bales are as similar as possible to each other.

One way of decreasing the slice thickness is to decrease the driving speed of the baler. This results in less crop material being gathered and fed into the pre-compression chamber to form each slice of material. The driving speed of the baler may also be increased if the controller determines, or the operator requests that the throughput of the baler should increase. It is important for the baler to find a balance between a fast throughput (i.e. a high driving speed), repeatable and accurate bale weights and maintaining the baling parameters within acceptable windows.

The steps of the method that are carried out while a bale is being made may be repeated while the bale is being made. The repetition of the method means that the baling parameter setpoints are adjusted at a higher frequency than in the prior art, therefore enabling a more accurate and precise control of bale weight, especially when the method is continually repeated while a bale is being made. If a typical hay or straw bale is approximately 240 cm long and comprises slices with an average width of approximately 50 mm, the bale will comprise 48 slices. Therefore, if, e.g., the baling parameter setpoints are adjusted every 4 slices, a total of 12 adjustments can be made over the course of the bale's creation.

Preferably, the steps of the method carried out while the bale is being made are repeated every time n slices of the bale have been completed, and the baler operating data is received for the previous m slices of the bale, wherein n is greater than or equal to m. This ensures that the baler operating data relates to slices of the bale that have been according to the most recent setpoints. It is most preferred that n is greater than m, to allow for time for the baler to adjust to the new setpoints before re-evaluating the predicted final weight of the bale.

The method may comprise adjusting the model, which may comprise the steps of: measuring the final weight of the bale using a bale weight sensor; calculating a difference between the measured final weight of the bale with the predicted final weight of the bale; calculating a model offset in dependence on the difference between the measured and predicted final weights of the bale; and applying the model offset to the model. By iterating and correcting the model, the model can self-calibrate and respond to changes in crop conditions. The ability of the model to self-correct also enables the model to be used in a variety of different conditions and with different crops without a loss in accuracy.

When multiple measurements of the measured final weight of the bale are taken, the model offset may be calculated using a Kalman filter. In utilising a Kalman filter, noise in the measured final weight of the bale can be mitigated so that a more accurate value of the model offset may be determined.

In another aspect, the invention also provides an agricultural baler comprising a controller configured to perform the method described above. The agricultural baler may be a large square baler.

BRIEF DESCRIPTION OF THE DRAWINGS

So that it may be more easily understood, the invention will now be described with reference to the following drawings, in which.

DETAILED DESCRIPTION OF THE PREFERRED EMBODIMENTS

Figure 1:
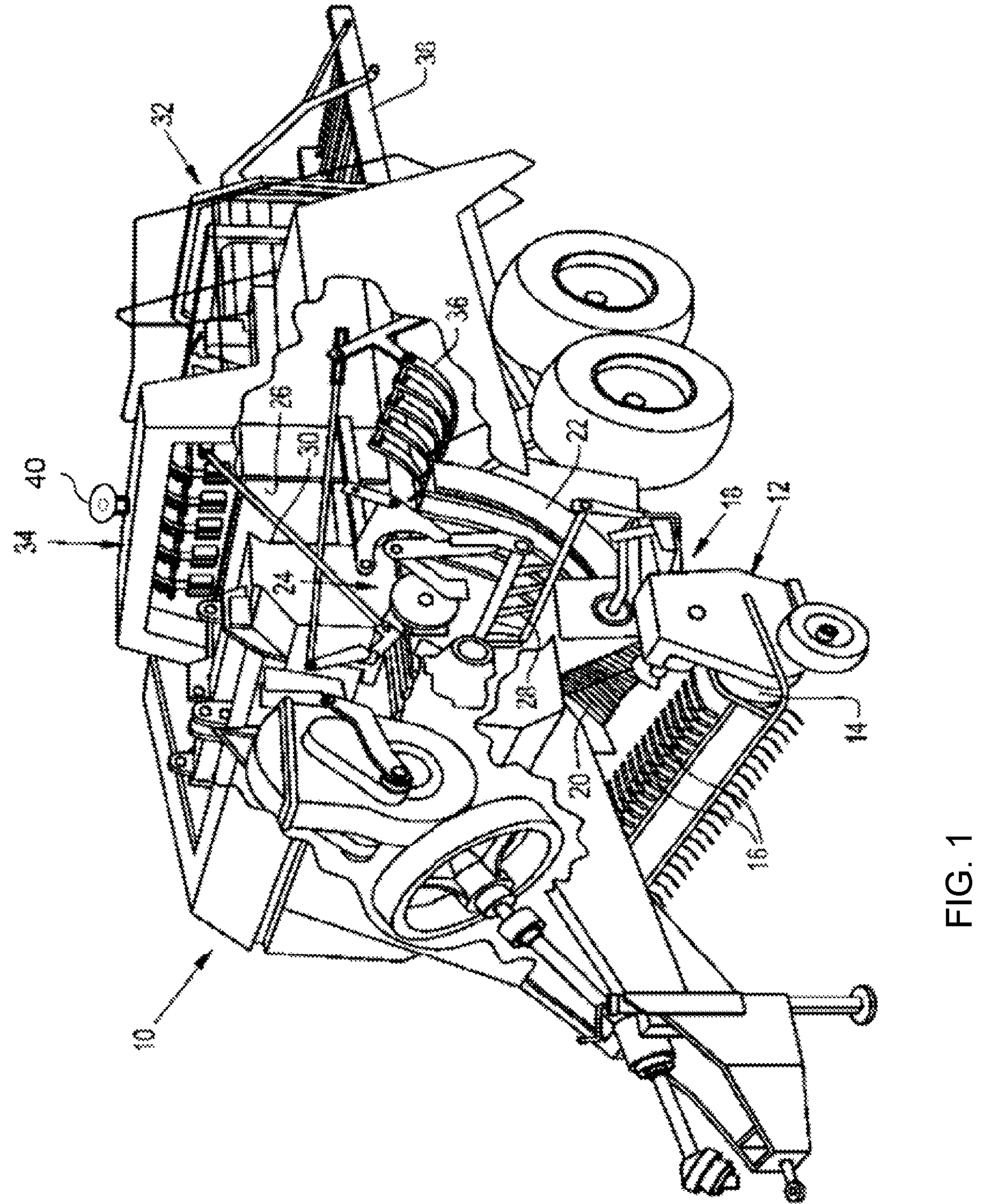
FIG. 1 shows a schematic side view of an agricultural baler wherein the invention may be used.

FIG. 1 shows an agricultural baler 10 in the form of a large square baler. In general, the baler 10 may form bales from a crop material in the following manner. It will be appreciated that, while the general principles of operation are described below with reference to the baler 10 of FIG. 1, that these principles apply generally to agricultural balers, which may have different or equivalent features to the baler 10 shown in FIG. 1.

The baler 10 has a pickup unit or apparatus 12 for lifting crop material from windrows. The pickup apparatus 12 has a rotatable pickup roll (or rotor or cylinder) 14 with a plurality of pickup tines 16 to move the collected crop rearward towards a rotor cutter apparatus 18. Optionally, a pair of stub augers (one of which is shown, but not numbered) is positioned above the pickup roll 14 to move the crop material laterally inward.

The rotor cutter apparatus 18 has a rotor assembly with rotor tines 20 that push the crop towards a knife rack with knives for cutting the crop and into a pre-compression chamber 22 to form a slice of crop material. The tines 20 intertwine the crop together and pack the crop within the pre-compression chamber 22. The pre-compression chamber 22 and the rotor assembly with the tines 20 function as a first stage for crop compression.

Once the pressure in the pre-compression chamber 22 reaches a predetermined sensed value, a stuffer unit or apparatus 24 moves the slice of crop from the pre-compression chamber 22 to a bale chamber 26. The stuffer apparatus 24 includes stuffer forks 28 which push the slice of crop directly in front of a plunger 30, which reciprocates within the bale chamber 26 and compresses the slice of crop into a flake. The stuffer forks 28 return to their original state after the slice of material has been moved into the bale chamber 26. The plunger 30 compresses the slices of crop into flakes to form a bale and, at the same time, gradually advances the bale toward an outlet 32 of the bale chamber 26. The bale chamber 26 and plunger 30 function as a second stage for crop compression.

When enough flakes have been added and the bale reaches a full (or other predetermined) size, the knotters 34 are actuated which wrap and tie twine around the bale while it is still in the bale chamber. Needles 36 bring the lower twine up to the knotters 34 and the tying process then takes place. The twine is cut, and the formed bale is ejected from a discharge chute 38 as a new bale is formed.

The discharge chute 38 may comprise a weighing system and bale weight sensor to weigh finished bales.

As set out above, it is desirable for the bales produced by a baler to be of a substantially constant weight. The weight of the bale is determined by the size and number of slices that make up the bale and also the density of each constituent slice. The density of each slice can be influenced by crop parameters, such as the type of crop (straw, hay, etc.) and the moisture level thereof or by baling parameters related to the baler 10, such as the chamber load, the plunger torque, or the thickness of the slices made in the chamber. The chamber load relates to the pressure imparted to the bale (and the slices thereof) inside the bale chamber 26 by the chamber walls, while the plunger torque relates to the torque with which the plunger 30 compresses the compresses the slice within the bale chamber 26. While an operator has no control over the crop parameters, it is possible to control the baling parameters during operation of the baler 10. Control of the baling parameters therefore enables control of the weight of the bales made by the baler 10.

A method of controlling the weight of bales made by the baler 10 in accordance with an embodiment will now be set out. The method is apt to be performed by a controller of the baler 10. The method is summarised in the flow chart of FIG. 2.

First, at step 100, the controller receives a bale weight setpoint. The bale weight setpoint may be input to the controller by an operator of the baler, using a user interface system. The bale weight setpoint defines an initial final weight prediction for each bale. The operator may input other setpoints, such as a bale length setpoint, a slice thickness setpoint, or a number of slices per bale setpoint, in addition to the bale weight setpoint. While a bale is being made in the bale chamber 26, the controller also receives crop parameter data related to that bale. This data may include crop type data and crop moisture level data. The crop type data may also be input by the operator of the baler 10, while the crop moisture level data may be obtained via a crop moisture level sensor located in the baler 10, for example in the pre-compression chamber 22 or the bale chamber 26.

Each baling parameter has an associated baling parameter setpoint, which acts as a target value for that baling parameter. Adherence of the baling parameters to the respective setpoints is managed by the controller, in a manner that is not central to the inventive concept discussed herein. The skilled person will be aware of many control methods aimed at ensuring adherence of a parameter with an associated setpoint.

Before the first bale is made in a new baling session, an initial set of baling parameter setpoints are determined by the controller, as shown at step 200. This can occur in a variety of ways, for example by the controller setting a default value for certain baling parameter setpoints, or by the controller calculating a value for certain baling parameter setpoints based on operator inputs and a model, as will be appreciated from the description below. If default values are used, the initial slice thickness setpoint may be, for example, 50 mm, while the initial chamber load setpoint may be 70%, where a value of 100% can correspond either to a maximum allowable chamber load or a maximum chamber load that can be generated by the walls of the bale chamber 26. In alternative embodiments, the operator may specify initial setpoints for certain baling parameters, such as for the bale length and slice thickness as described above, or the controller may select the initial setpoints for certain baling parameters from those used in a previous baling session.

At step 300, a bale is created according to the baling parameter setpoints. While a bale is being made according to the initial baling parameter setpoints, the controller receives baler operating data related to the baling parameters at step 400. For example, the chamber load may be measured by a chamber load sensor inside the bale chamber 26, the plunger torque may be measured by a plunger torque sensor on the plunger 30 and the slice thickness may be measured by a slice thickness sensor located either in the bale chamber 26 or on the plunger 30. The baler operating data includes a mean chamber load, a mean plunger torque and a standard deviation of the slice thickness. Data relating to other baling parameters may also be received from various corresponding sensors depending on the exact model used.

The controller inputs the baler operating data into a weight prediction model, which generates as an output a predicted final weight of the bale. This therefore adjusts the final weight prediction for the bale, as shown at step 500. The model may take the form of a linear equation, with different input variables each multiplied by a modification factor and then summed to generate the predicted final weight. The modification factors are specific to the model and may be determined by fitting data relating to the different input variables to measured bale weights. Other factors, such as the crop type may also act as input variables to the weight prediction model in the same way. For qualitative input variables, such as crop type, the crop type data input by the operator of the baler 10 may be converted to a numerical value by the controller before being input into the model as an input variable.

To generate the predicted final weight of the bale, the weight prediction model may initially generate a predicted weight per unit length of the bale. The controller can then multiply this value by the slice thickness and the number of slices in the bale, or by a bale length setpoint, in order to generate the predicted final weight of the bale and so update the final weight prediction for that bale. The controller then compares the final weight prediction for the bale to the bale weight setpoint and calculates a difference between the two. At step 600, the controller then applies the weight prediction model to determine a setpoint correction based on the difference between the final weight prediction for the bale and the bale weight setpoint to determine how the baling parameters may be adjusted to ensure that the weight of the bale reaches the bale weight setpoint. The setpoint correction is then applied to a baling parameter setpoint (step 700) and construction of the bale is continued until the bale is completed at step 800. When the bale is completed, construction of a new bale is commenced at step 900, which follows the steps 300 onwards described above.

As discussed above, each of the baling parameters has an associated baling parameter setpoint, which acts as a target value for that parameter. In a preferred embodiment of the invention, only one baling parameter setpoint is changed at a time. Preferably, the baling parameter setpoint that is prioritised for adjustment is the chamber load setpoint. For example, the controller may be programmed to adjust the chamber load setpoint if both the current chamber load setpoint and the current plunger torque setpoint are within respective threshold operating ranges. Otherwise, the slice thickness setpoint may be adjusted.

For example, if the chamber load setpoint is above its threshold operating range, if the final weight prediction for the bale is below the bale weight setpoint, the slice thickness may be decreased to further compress the crop (thereby increasing the density of subsequent slices of the bale) without causing damage to the walls of the chamber 26. Alternatively or additionally, if the controller determines, via operator input or otherwise, that the throughput of the baler 10 must be changed, the slice thickness setpoint may be adjusted. For example, if it is determined that the throughput of the baler 10 must increase, the slice thickness setpoint may be increased so that the tractor towing the baler 10 drives faster to increase the flow of the incoming crop.

In modifying the selected baling parameter setpoint, the controller multiplies the setpoint correction by a gain factor to generate a modified setpoint correction. In preferred embodiments of the invention, the gain factor is between zero and one so that stable convergence towards the baling weight setpoint is achieved. In some cases, the gain factor may be adjusted in dependence on the value of either the baling parameter setpoint or the final weight prediction. For example, if the final weight prediction for the bale (or equivalently the predicted final weight of the bale or the predicted weight per unit length of the bale generated by the weight prediction model) is too high, the gain may be temporarily reduced in order to prevent any significant further increases to the weight of the bale as a result of the adjustment to the relevant baling parameter setpoint that may end up outside the operating range of the baler 10. In any case, once the modified setpoint correction is generated, it is then applied to the baling parameter setpoint, with adherence to the new baling parameter setpoint monitored by the controller as before.

In addition to the conditions placed on the gain factor described above, the setpoint corrections themselves may have limits placed on their maximum values. These limits will depend on specific properties of the baler 10 but, for example, the maximum setpoint correction for the chamber load setpoint may be 10%, while the maximum setpoint correction for the slice thickness setpoint may be 15 mm.

Figure 2:
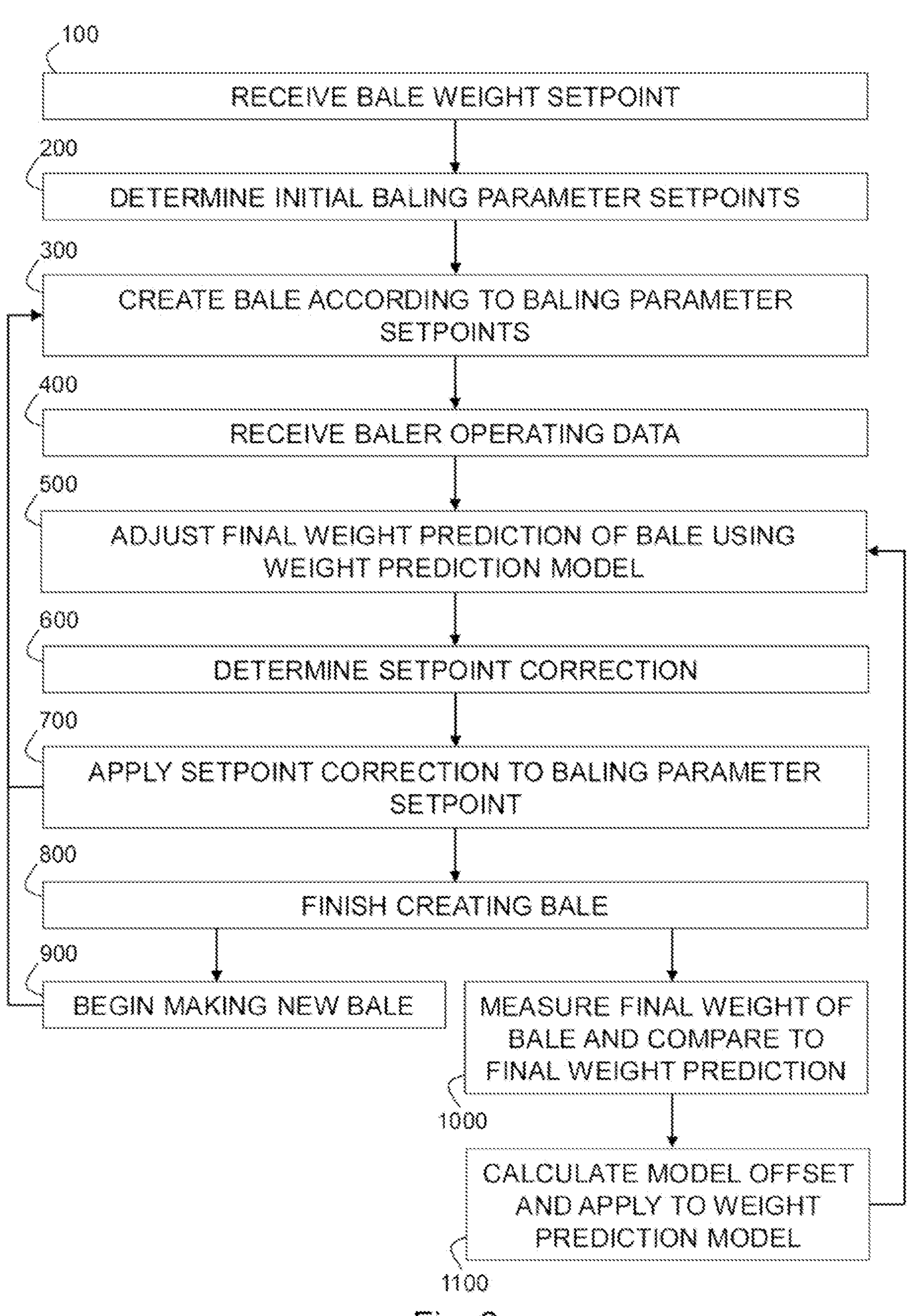
FIG. 2 shows a flow-chart illustrating the method of the invention.

As discussed above, completed bales are weighed by a weighing system as they leave the baler 10, shown at step 1000 in FIG. 2. The measured final weight can be used to calibrate and/or improve the weight prediction model. The final weight prediction for the bale can be compared by the controller to the measured final weight and a difference therebetween can be calculated. The controller may then calculate a model offset, as shown at step 1100, in dependence on the value of the difference between the final weight prediction and the measured final weight of the bale. The model offset is then applied to the weight prediction model. In the case that the weight prediction model is a linear equation of terms, the model offset may be a simple additive offset.

The updated weight prediction model may be used to update one or some of the baling parameter setpoints, and in particular the chamber load setpoint. This might occur in a number of ways. Since the weight prediction model will be updated based on an offset calculated after a bale (Bale X) has been weighed, and therefore significantly after Bale X has been completed due to the presence of other completed bales ahead of Bale X in the baling chamber 26, the update to the weight prediction model will occur while another bale (Bale Y) is being made. There are a number of ways in which this update can be handled, therefore. One option is to apply the updated weight prediction model and the updated baling parameter setpoint(s) only once the next bale (Bale Y+1) has started being made. Alternatively, the construction of Bale Y may be continued according to the updated baling parameter setpoint(s) resulting from the updated weight prediction model. It is important that the controller is programmed to synchronise the values of the final weight prediction and the measured final weight to the same respective bale.

Due to the inherent high level of noise in the measured final weights of the bales, the controller may apply a filter to the calculated model offsets. The filter may act in such a way that the weight prediction model is only updated (i.e. the model offset is applied to the weight prediction model) when the model offset has converged to a stable value. For example, a Kalman filter may be used to set a threshold covariance value that the covariance of the set of model offset values must fall below before the model offset is applied to the weight prediction model.

It can be the case that measurements of the weight of the bale can be faulty, for example if a bale falls onto the scale while the baler 10 is cornering. The value, or values, of the measured final weight of the bale must therefore be analysed to ensure that it, or they, are valid. For example, the measured final weight of the bale may be considered invalid if it lies outside a threshold range or if it differs from a previous measured final weight by more than a threshold value.

In the simplest implementation of the invention, the baler operating data is sent to the controller only once per bale. However, it is preferred that the steps of receiving the baler operating data, using that data in a weight prediction model to adjust a final weight prediction for the bale and consequently a baling parameter setpoint of one the baling parameters are repeated throughout manufacture of the bale in order to provide further control of the bale weight and so the baler operating data may be sent to the controller multiple times per bale. For example, the adjustment of a baling parameter setpoint may occur every 4 slices. This enables higher frequency control over the setpoints of the baling parameters, which in turn provides finer scale control over the weight of the bale and enables greater consistency of the bale weight and greater conformity of the bale weight to the bale weight setpoint.

In more general terms, if the selected baling parameter setpoint is adjusted every time n slices have been completed, the baler operating data should relate to the previous m slices, where m is no greater than n to ensure that the baler operating data input into the weight prediction model relates to the latest baling parameter setpoints set by the controller. Preferably, n is greater than m to ensure that the baler 10 is given time to converge to the latest setpoints before re-evaluating the final weight prediction for that bale.

When the baling parameter setpoint is adjusted multiple times during the formation of a bale, this provides further complexity in how to handle updates to the model caused by the application of the model offset occurring during the creation of a different bale (Bale Y) to the bale to which the model offset related (Bale X). As with the scenario where the baler operating data was sent to the controller only once per bale, the updated model may only be applied from the point at which the next bale (Bale Y+1) has started being made.

Alternatively, the updated model and the updated baling parameter setpoint(s) may be applied during construction of Bale Y. Future predictions of the final weight of Bale Y may therefore be made using the updated model, and so future updates to the selected baling parameter setpoint in dependence on the difference between the final weight prediction for the bale and the bale weight setpoint may also be made on the basis of the updated model. The updated model might also be used to retrospectively update the final weight prediction values relating to Bale Y made using the previous version of the model in order to further improve the accuracy of future predictions of the final weight of Bale Y made by the weight prediction model, and so improve adherence of the measured final weight of Bale Y to the bale weight setpoint.

What is claimed is:

1. A method of controlling the weight of bales made by an agricultural baler, the method comprising:

receiving a bale weight setpoint;

receiving crop parameter data; and, while a bale is being made:

i) receiving baler operating data relating to baling parameters;

ii) inputting the crop parameter data and the baler operating data into a weight prediction model to generate a predicted final weight of the bale;

iii) changing a baling parameter setpoint of one of the baling parameters based on the predicted final weight of the bale and the bale weight setpoint, and iv) repeating steps i), ii), and iii) while the bale is being made, wherein steps i), ii), and iii) are repeated every time n slices of the bale have been completed, and wherein the baler operating data is received for previous m slices of the bale, wherein n is greater than or equal to m.

2. The method of claim 1, wherein the baler operating data comprise an average chamber load in a chamber of the agricultural baler, an average plunger torque of a plunger in the baler, a slice thickness variation parameter representing the variation in a thickness of slices of the bale, and a number of slices per bale.

3. The method of claim 1, wherein the crop parameter data comprises crop type data and crop moisture level data.

4. The method of claim 1, wherein changing the baling parameter setpoint of one of the baling parameters comprises:

calculating a difference between the predicted final weight of the bale and the bale weight setpoint;

calculating a setpoint correction using the weight prediction model based on the difference;

multiplying the setpoint correction by a gain factor to generate a modified setpoint correction; and applying the modified setpoint correction to the baling parameter setpoint.

5. The method of claim 4, wherein the gain factor is between zero and one.

6. The method of claim 1, wherein the baling parameter setpoint is based on at least one of a chamber load setpoint, a slice thickness setpoint, or a number of slices per bale.

7. The method of claim 6, wherein the step iii of changing the baling parameter setpoint comprises changing either the chamber load setpoint, the slice thickness setpoint, or the number of slices per bale.

8. The method of claim 7, wherein the step iii of changing the baling parameter setpoint comprises changing the chamber load setpoint if current values of the chamber load setpoint and a plunger torque of a plunger in the baler are within respective threshold operating ranges.

9. The method of claim 1, further comprising adjusting the weight prediction model, wherein adjusting the weight prediction model comprises:

measuring a final weight of the bale using a bale weight sensor;

calculating a difference between the measured final weight of the bale with the predicted final weight of the bale;

calculating a model offset in dependence on the difference between the measured and predicted final weights of the bale; and applying the model offset to the weight prediction model.

10. The method of claim 9, wherein the model offset is calculated using a Kalman filter.

11. An agricultural baler comprising a controller configured to perform the method of claim 1.

12. A method of controlling the weight of bales made by an agricultural baler, the method comprising:

receiving a bale weight setpoint;

receiving crop parameter data; and while a bale is being made:

receiving baler operating data relating to baling parameters;

inputting the crop parameter data and the baler operating data into a weight prediction model to generate a predicted final weight of the bale;

changing a baling parameter setpoint of one of the baling parameters based on the predicted final weight of the bale and the bale weight setpoint, and adjusting the weight prediction model, wherein adjusting the weight prediction model includes:

measuring a final weight of the bale using a bale weight sensor;

calculating a difference between the measured final weight of the bale with the predicted final weight of the bale;

calculating a model offset in dependence on the difference between the measured and predicted final weights of the bale; and applying the model offset to the weight prediction model.

13. The method of claim 12, wherein the model offset is calculated using a Kalman filter.

14. An agricultural baler comprising a controller configured to perform the method of claim 12.

* * * * *